United States Patent
Jaspers

(10) Patent No.: US 7,573,515 B2
(45) Date of Patent: *Aug. 11, 2009

(54) METHOD AND APPARATUS FOR PROCESSING A SENSOR SIGNAL HAVING A PLURALITY OF PIXELS FROM AN IMAGE SENSOR, COMPUTER PROGRAM PRODUCT, COMPUTING SYSTEM AND CAMERA

(75) Inventor: Cornelis Antonie Maria Jaspers, Hapert (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 957 days.

This patent is subject to a terminal disclaimer.

(21) Appl. No.: 10/519,060

(22) PCT Filed: Jun. 24, 2003

(86) PCT No.: PCT/IB03/02656

§ 371 (c)(1),
(2), (4) Date: Dec. 22, 2004

(87) PCT Pub. No.: WO2004/006565

PCT Pub. Date: Jan. 15, 2004

(65) Prior Publication Data

US 2005/0254117 A1    Nov. 17, 2005

(30) Foreign Application Priority Data

Jul. 4, 2002    (EP) ................................... 02077689

(51) Int. Cl.
*H04N 5/335*    (2006.01)

(52) U.S. Cl. .................................... 348/272; 348/222.1
(58) Field of Classification Search ................. 348/234, 348/280, 222.1, 272–273
See application file for complete search history.

(56) References Cited

U.S. PATENT DOCUMENTS

| | | | | |
|---|---|---|---|---|
| 6,320,593 B1 * | 11/2001 | Sobel et al. | .................. | 345/600 |
| 6,330,029 B1 * | 12/2001 | Hamilton et al. | ............. | 348/272 |
| 6,426,773 B1 * | 7/2002 | Suzuki | ........................ | 348/272 |
| 2002/0003578 A1 | 1/2002 | Koshiba et al. | | |

FOREIGN PATENT DOCUMENTS

| | | |
|---|---|---|
| WO | WO 9904555 | 1/1999 |
| WO | WO 9939509 | 8/1999 |
| WO | WO 01/50722 A2 | 9/2001 |

* cited by examiner

Primary Examiner—Tuan V Ho

(57) ABSTRACT

A reconstruction method based on a white-compensated luminance reconstruction and using filter weights referred to as smartgreen-parameters is proposed. An aliasing free luminance signal, even at the multiples of the sample frequency and in case of a camera without optical low pass filter is achieved. Moreover this white-compensated luminance-signal is free of signal distortion. The proposed method allows a suitable low pass filter to be added or combined and a is particular well suited to implement a variety of abasing free color- and contour-filters. The RGB color signals are reconstructed using filter weights which can be chosen as a function of the heaviness of the sensor matrix and of the optical transfer of the camera.

15 Claims, 18 Drawing Sheets

Fig. 6

Figure 1:
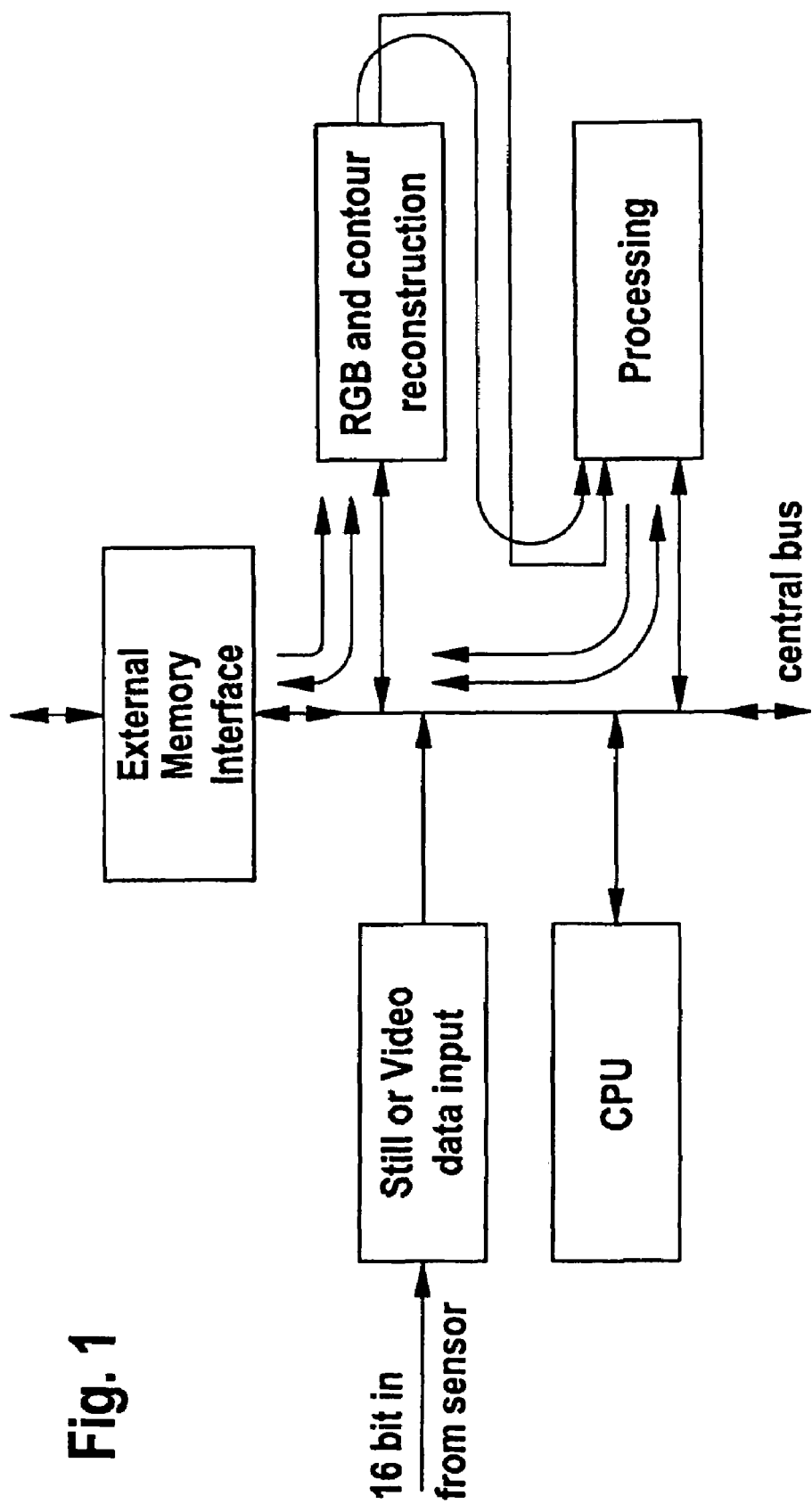

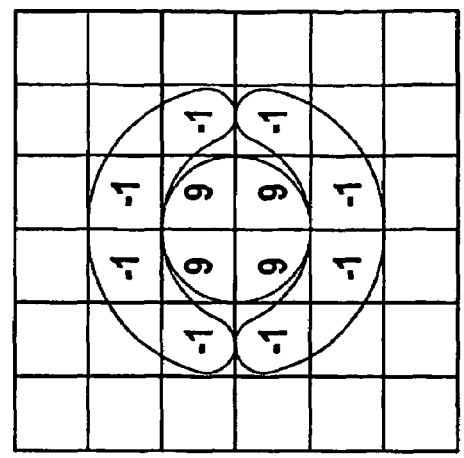
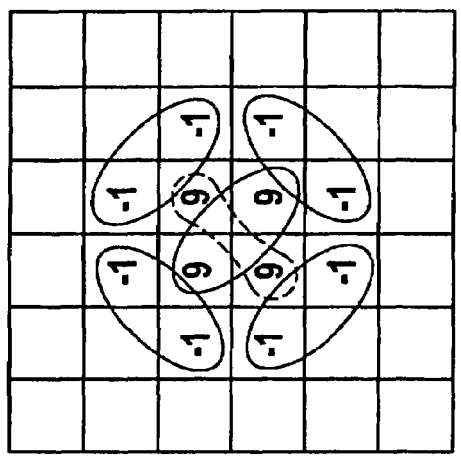
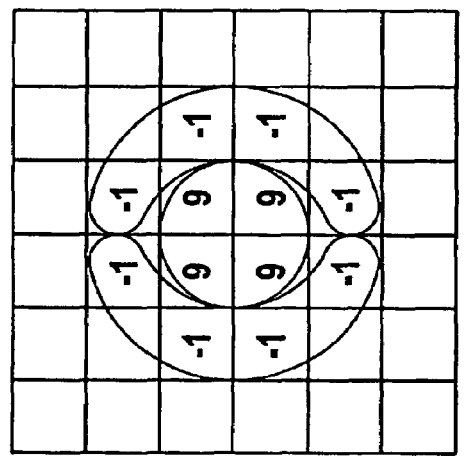
Fig. 10
Fig. 11

```
3  5 3   5 3
5 12 20 12 5
3 20 48 20 3  +11
5 12 20 12 3   11
3  5 3   5 3
```

```
001100  sigmaYlf=84
024420
149941
149941
024420
001100
```

Fig. 21

|   |   |    |    |    |   |
|---|---|----|----|----|---|
|   |   | -1 | -1 |    |   |
|   | -2 | -7 | -7 | -2 |   |
| -1 | -7 | 18 | 18 | -7 | -1 |
| -1 | -7 | 18 | 18 | -7 | -1 |
|   | -2 | -7 | -7 | -2 |   |
|   |   | -1 | -1 |    |   | sigma(Yn-Ylf) = 44

|   |   |    |    |    |   |
|---|---|----|----|----|---|
|   |   |    |    |    |   |
|   | -7 | -25 | -25 | -7 |   |
|   | -25 | 57 | 57 | -25 |   |
|   | -25 | 57 | 57 | -25 |   |
|   | -7 | -25 | -25 | -7 |   |
|   |   |    |    |    |   | sigma(Yn-Ylf) = 308

|   |   |    |    |    |   |
|---|---|----|----|----|---|
|   |   |    |    |    |   |
|   | -1 | -2 | -2 | -1 |   |
|   | -2 | 5 | 5 | -2 |   |
|   | -2 | 5 | 5 | -2 |   |
|   | -1 | -2 | -2 | -1 |   |
|   |   |    |    |    |   | sigma(Yn-Ylf) = 44

METHOD AND APPARATUS FOR PROCESSING A SENSOR SIGNAL HAVING A PLURALITY OF PIXELS FROM AN IMAGE SENSOR, COMPUTER PROGRAM PRODUCT, COMPUTING SYSTEM AND CAMERA

The invention regards a method for signal processing, wherein a sensor signal of an image sensor is provided as an input and wherein the input is reconstructed in a filter to establish an output for further processing, wherein the filter comprises at least one reconstruction-filter selected from the group consisting of: a luminance-reconstruction-filter, a red-green-blue-color-reconstruction-filter and a contour-reconstruction-filter, wherein the input comprises a plurality of pixels and a pixel provides a color value assigned to at least one of the colors red, green or blue. The invention also regards an apparatus for signal processing which is in particular adapted to execute the method; comprising an image sensor for providing a sensor signal as an input and a filter for reconstructing the input to establish an output for further processing, wherein the filter comprises at least one reconstruction-filter selected from the group consisting of: a luminance-reconstruction-filter, a red-green-blue-color-reconstruction-filter and a contour-reconstruction-filter, wherein the input comprises a plurality of pixels and a pixel provides a color value assigned to at least one of the colors red, green or blue. Further the invention regards a computer program product, a computing system and a camera adapted for signal processing.

Digital cameras based on digital signal image sensing of e.g. video and still images may be advantageously equipped with an image sensor comprising a red-green-blue (RGB) Bayer-color-filter-array. In such RGB Bayer-color-filter array each pixel senses a red, green or blue primary color in a predefined pattern. This pattern is built up of alternating green/red columns and green/blue columns. Such a sensor may have a limited resolution in comparison with a camera using a separate image sensor for each primary color. However, a camera with three image sensors has three times as much pixels contributing to the resolution than a single RGB Bayer-sensor. Using three sensors is for most applications disadvantageous due to cost and size requirements of the application. On the other hand, when using one single image sensor to sense all three primary colors red, green and blue within one single array, advantageously in a RGB Bayer-color-filter array, it is necessary to reconstruct missing pixels of certain colors to process a consistent whole of a picture. Due to the RGB Bayer-structure, different Nyquist-domains respectively with regard to green, red and blue colors result in a color dependent resolution and possibly aliasing patterns. Nevertheless the RGB Bayer-structure is one of the best performing signal color arrays.

Several interpolation schemes may be provided to increase signal quality. In WO99/39509 a conventional method of interpolation is described in rather general terms wherein an intermediate color signal is interpolated at positions where no signal of a given color is present and an average of a given color is generated.

A further method for signal processing uses a more advantageous interpolation scheme as described in the WO99/04555 and in the European patent application with the application number EP 01 200 422.2 not yet published. However such methods still suffer from e.g. aliasing of a free luminance signal or further signal distortion. Such signal distortion especially results in an erroneous generation of false colors in an image.

In WO 99/04555 a green reconstruction method for a RGB Bayer image sensor has been described which merely concerns the green color reconstruction. The red and blue colors remain reconstructed in a conventional way. Merely a missing green pixel is reconstructed. The reconstruction of the missing green pixel is carried out by means of a median filter sorting three specific variables: two of them are derived from the green color, the third one from the red or blue color. A disadvantage of this method is, that for high saturated colored edges artifacts are introduced which look like the border of a postage stamp. The algorithm disclosed in WO 99/04555 will be referred to as the smartgreen1-algorithm. The algorithm is based on the concept that resolution losses are best observed at high frequencies near white scene parts and less good near colored parts. Keeping this in mind, the contribution of the red and blue pixels is used to help determining the reconstruction value of the missing green pixels. The object of the smartgreen1-reconstruction is to maximize the resolution of the green color. For this purpose the median filter algorithm is applied as follows: naturally, the location occupied by a red (R) or blue (B) pixel is a location of a missing green pixel. In the smartgreen1-reconstruction-algorithm a center value of a 3×3 pixel array, also called the median value, is applied for the reconstruction of the missing green pixels. Consequently, the simple median filter for green merely replaces a conventional interpolation concept of green reconstruction, whereas the conventional red and blue reconstruction method is maintained to be a simple interpolation. Luminance filtering, color filtering and contour filtering is also restricted to the filtering for green. Also false color detection is merely based on a conventional interpolation concept of green reconstruction and also the conventional red and blue reconstruction is maintained to be a simple interpolation.

Such smartgreen1-reconstruction method improves the resolution of the green pixels in the horizontal and vertical direction with the aid of the information of a red and/or a blue pixel. This conventional method relies on interpolating the color sample to be interpolated in dependence upon neighboring color samples of the same color and a differently colored sample merely from the same location. As a consequence, the reconstructed signal suffers from red-and/or blue-colored aliasing. Vertical and horizontal colored edges suffer from a green intensity modulation in the respective direction resembling the border of a postage stamp.

Further improvement as outlined in EP 01200422.2, herein referred to as the smartgreen2-reconstruction-algorithm, was able to significantly improve resolution but not to remove the mentioned disadvantages of signal distortion and signal aliasing. In particular at edges and high frequencies some signal distortion is still visible such as alternating colors with neighboring pixels. Artifact black and also white dots are erroneously generated.

This is where the invention comes in, the object of which is to specify a method and apparatus for signal processing and also a computer program product for signal processing, a computing system and a camera adapted for signal processing such that signal quality is improved. In particular, a signal should be improved with regard to signal distortion, and aliasing, but the signal should still provide sufficient resolution.

As regards the method as the object is achieved by a method as mentioned in the introduction, wherein in accordance with the invention the method further comprises the steps of:

applying the reconstruction-filter to an array of pixels of predetermined array size comprising a number of pixels, wherein at least one of the number of pixels is formed by a red-pixel assigned to the color of red, at least one of the number of pixels is formed by a blue-pixel assigned to the color of a blue, and at least one of the number of pixels is formed by a green-pixel assigned to the color of green, and weightening the red- and/or the blue-pixel by a green-parameter, summarizing the pixels of the array into one output-pixel, and centering the output-pixel in the array.

As regards the apparatus the object is achieved by an apparatus as mentioned in the introduction wherein in accordance with the invention it is proposed that the reconstruction-filter is adapted to be applied to an array of pixels of predetermined array size comprising a number of pixels, wherein at least one of the number of pixels is formed by a red-pixel assigned to the color of red, at least one of the number of pixels is formed by a blue-pixel assigned to the color of a blue, at least one of the number of pixels is formed by a green-pixel assigned to the color of green and wherein the apparatus is further comprising:

means for weightening the red- and/or the blue-pixel with a green-parameter, means for summarizing the pixels of the array into one output-pixel, and means for centering the output-pixel in the array.

The term pixel as used herein in particular refers to the value of a color sample in the signal.

The present invention has arisen from the idea to provide a concept of flexible design for the reconstruction of images and based on a white compensated luminance-reconstruction. This idea basically is realized by weightening the red- and/or blue-pixel with a green-parameter, whereas prior art concepts merely rely on the reconstruction of a missing green-pixel. The proposed reconstruction-filters are designed to be applied to an array of pixels of predetermined array size. Consequently filtering is performed in an advantageous way on this array. Whereas conventional methods rely on simple interpolation in dependence upon neighboring samples or a sample of the same location, the proposed concept provides specifically adapted reconstruction-filters which take into account all pixels of the array. The proposed white compensated concept results advantageously in an aliasing free luminance signal, even at the multiples of the sample frequency in case of a camera without optical low pass filter. Moreover this white compensated luminance signal is free of signal distortion. The basic method and apparatus as proposed are adapted to offer a broad and flexible extension. It is possible to offer a variety of several reconstruction-filters which may be chosen and adjusted e.g. in dependence of an optical transfer of an optical system and/or a sensor matrix of an image sensor. The proposed method and apparatus are capable to maintain a rather independency of optical low pass filters. This is particular advantageous as camera designs of potential customers may vary. The proposed method and apparatus are capable to implement adjustable false-color-filters in various ways and in a simple manner as will be outlined below.

Continued developed configurations of the method are described in the dependent method claims. The proposed apparatus may be improved by respective means for executing the method.

In particular it is preferred that a center-output-pixel of a second filter subsequent to a first filter is positioned in phase with the output-pixel, in particular the center-output-pixel is centered at the same center position of the array as the output-pixel. Most advantageously this may be performed by an additional post filter, in particular a post filter as will be further described below.

In a preferred configuration the reconstruction-filter is formed by a luminance-reconstruction-filter and the pixels of the array are added together in one white pixel being the output-pixel. Most preferably the green-parameter or a number of green parameters are chosen in dependence of a sensor matrix of the image sensor. Most preferably two green parameters are provided. Moreover the green parameter or a number thereof may be chosen in dependence of an optical transfer of an optical system providing an image signal to the image sensor. Thereby the RGB-color-signals are advantageously reconstructed with filter weights that can be chosen as a function of an optical transfer of a camera in combination with the heaviness of the sensor matrix. Thereby an application and image specific improvement of quality is achieved.

The basic concept of luminance reconstruction described above with one or more of the preferred configurations is in the following referred to as the "white compensated luminance-reconstruction" for RGB-Bayer-image-sensors, or simply "RGB-reconstruction". The green-parameters are also referred to as "smartgreen-parameters". Using the smart-green-parameters also with a red-and/or blue-pixel as defined by the proposed method and the further developed configurations thereof will be referred to as the "smartgreen3"-reconstruction method. Particular ways of determining the green-parameters are also described in WO 99/04555 and EP 01200422.2 and may be applied and used within smartgreen3 as well.

The specific kind of arranging filters and filter size of the proposed method results in an aliasing free signal, also, and in particular free from green-green differences. Details will be further outlined in chapters 2 and 3 of the detailed description with regard to a preferred embodiment and with reference to the drawing. Specifically a luminance-reconstruction-filter is applied to pixels of an array having an array size of 2×2 or 4×4 or 6×6 or larger if preferred. In a particular preferred configuration the luminance-reconstruction-filter is applied to an array size of 2×2 or 4×4. The filter size may be chosen as a function of the optical transfer. Also the weights for the respective filter may be chosen differently. Advantageously various luminance-reconstruction-filters are offered for appliance, in particular a luminance-reconstruction-filter is applied to an array size of 2×2 in case of no or slight optical low pass filtering and further a respective luminance-reconstruction-filter is applied to an increased array size of 4×4 or 6×6 upon heavier low pass filtering.

Additionally a low pass luminance signal may advantageously be generated by low-pass-filters applied to an array size of respectively 4×4 or 6×6. In an advantageous configuration the 4×4 or 6×6 low pass filter is combined with the 2×2 or 4×4 luminance-reconstruction filter respectively to establish one single filter. None of the resulting signals suffers from green non-uniformity artifacts caused by the sensor.

Nevertheless, depending on the optical transfer and the matrix, the reconstructed RGB signals may still suffer from a rest amount of colored aliasing according to the Nyquist-theorem. In order to still reduce the a rest amount of aliasing, additionally to the luminance-reconstruction-filter the color-reconstruction-filter and/or the contour-reconstruction filter may be applied. In particular, therefore a false-color-filter may be applied to eliminate false colors from the input. Preferably the color-reconstruction-filter comprises the false-color-filter.

Further advantageously a low pass luminance signal is realized having a transfer characteristic as equal as possible to the total RGB transfer, as will be described in the detailed description in chapter 3.3, in particular with regard to FIGS. 15, 16 and 17, 18 of the drawing. The matching of a 4×4 or 6×6 low-pass-luminance-filter with respectively a 3×3 or 5×5 green reconstruction-filter is preferably achieved by a 2×2 post-filter. This is described in detail with regard to the drawing and a preferred embodiment in chapter 3 of the detailed description.

In a further preferred configuration a high frequency luminance-filter is applied in dependence of an optical transfer of an optical system providing an image signal to the image sensor. Thereby a high-frequency aliasing free luminance component can be added to the low frequency reconstructed color signals in order to mask color artifacts. A corresponding preferred embodiment is described in the detailed description with regard to FIGS. 2 and 12 of the drawing.

The proposed method is adapted such that the optical transfer of the camera does not limit the application of a suitable filter. In other words, arbitrary optical low pass filters may be advantageously applied, merely depending on the application of a customer. It is even acceptable to apply no optical low pass filter at all. Especially this is achieved by the appliance of a false-color-filter as proposed, which is in particular adjustable independent of the optical transfer of the camera or of the sensor matrix. In particular, the false color filter can be adjusted as a function of the optical transfer of the camera at half of the pixel frequency. Also a color-reconstruction-filter may be offered in dependence of the optical transfer and a sensor matrix. The proper choice of coefficients of a color-reconstruction-filter as a function of the optical transfer and sensor matrix maximize the resolution for near-white colors which for average scenes seem to be the most important eye catchers. In particular sufficient resolution is provided while the amount of signal distortion is minimized. This will be outlined in particular in chapter 4 of the detailed description.

In the whole processing chain as described above, i.e. the—RGB-reconstruction, in particular comprising
  the implementation of a post-filter for phase matching;
  the luminance-signal processing;
  the color-reconstruction-signal processing, in particular comprising the implementation of a false-color-filter and a further post-filter; and
  the contour-signal processing, the amount of signal distortion is limited to an extremely low level.

This also holds for a final JPEG-conversion. In a preferred configuration as well column- and also row-wise processing may be performed to execute the smartgreen3-reconstruction-algorithm according to the proposed method. Such processing advantageously reduces the amount of internal memory and the amount of data swapping to and from an external memory. This will support processing effectivity and speed. Such measure also works if all data transfer is rotated by 90°.

The proposed method is advantageously executed on an apparatus as proposed above, in particular on a computing system and/or a semiconductor device. Such system may advantageously comprise an intermediate memory interface located between an image sensor and a processing chip. Thereby advantageously the length and the number of rows of a pixel array to be filtered is no longer restricted, also the amount of data swap to and from an external memory of course should not delay the processing time too much. Consequently, still real-time processing is possible. The computing system may be any kind of processor unit or system or computer.

Also real-time processing may preferably be performed without any memory as an intermediate interface. However, in this case, for cost reasons, the total amount of available row delays may be limited, in particular to two. This may result in that only three vertical taps are available for the RGB reconstruction as well as for the realization for the contour signal.

Further the invention leads to a computer program product storable on a medium readable by a computing system comprising a software code section which induces the computing system to execute the method as proposed when the product is executed on a computing system, in particular when executed on the computing system of a camera.

The invention will now be described with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein nor to anything less than the whole of the invention as disclosed herein and as claimed hereinafter. Further the features described in the description and the drawings and the claims disclosing the invention, may be essential for the invention considered alone or in combination.

Figure 2:
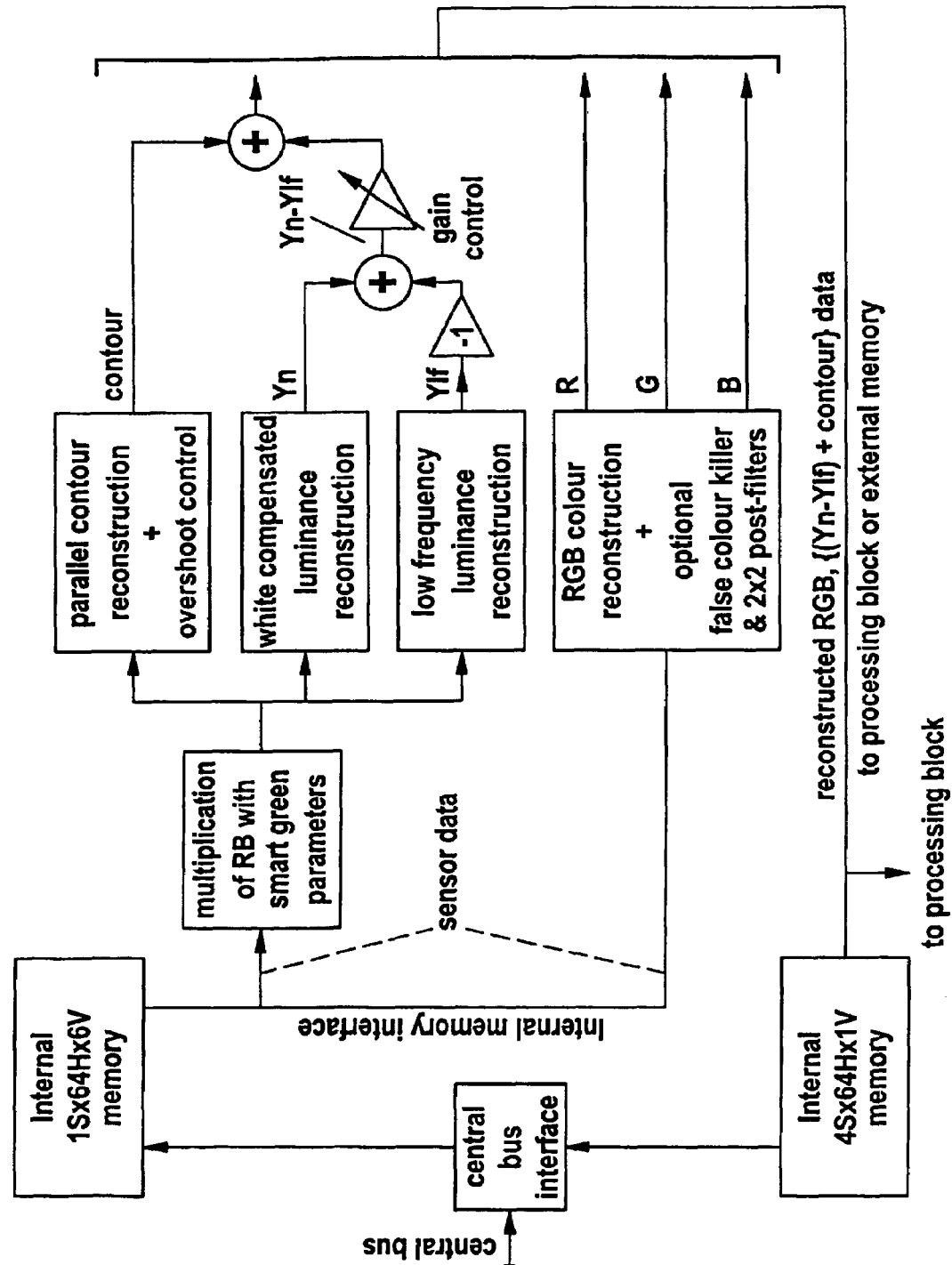

The detailed description accompanying the drawing provides the following chapters:
1. Processing flow of the white compensated luminance reconstruction method
2. The white compensated luminance signal
3. The low pass filtered luminance signal Ylf
   3.1 Adding high frequency components after matrix and white balance
   3.2 Desaturation at colored edges
   3.3 Defining the Ylf filter transfer
   3.4 Simplifying the circuitry
4. Defining smartgreen3 as a function of the optical transfer and sensor matrix
5. Conclusions The Figures of the drawing show preferred embodiments of the invention and are enumerated as follows:

FIG. 1: Location of RGB- and contour-reconstruction in a memory based architecture;

FIG. 2: Basic block diagram of the smartgreen3 reconstruction; (Particular information to the block regarding the multiplication of the R- and B-colors with the smartgreen parameters may be taken from WO99/04555.

Figure 3:
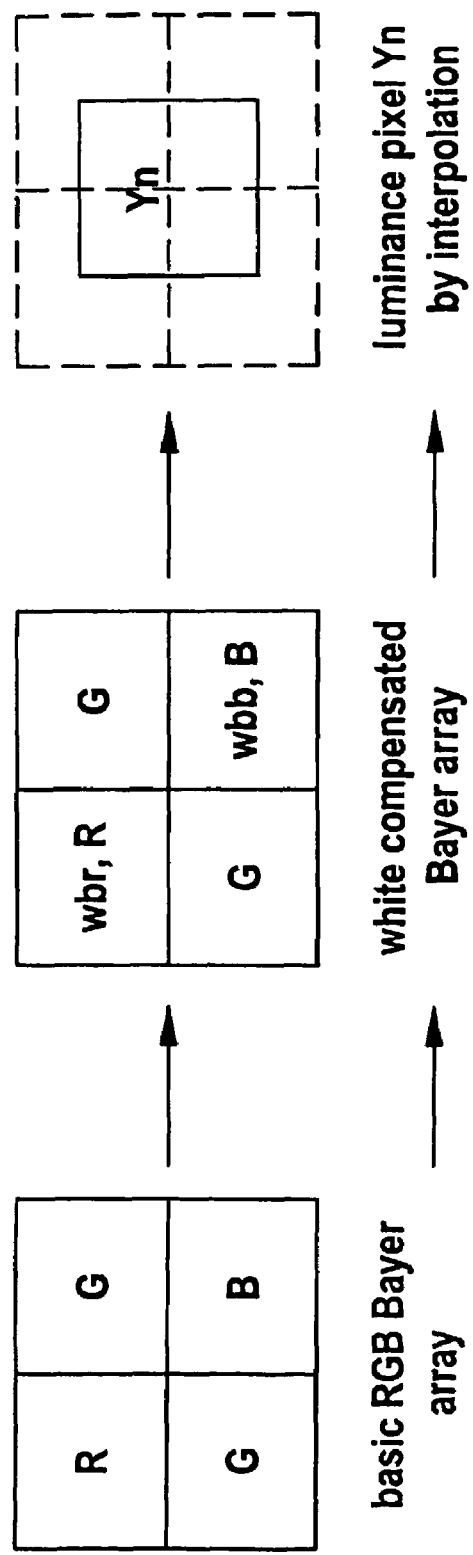
Figure 4:
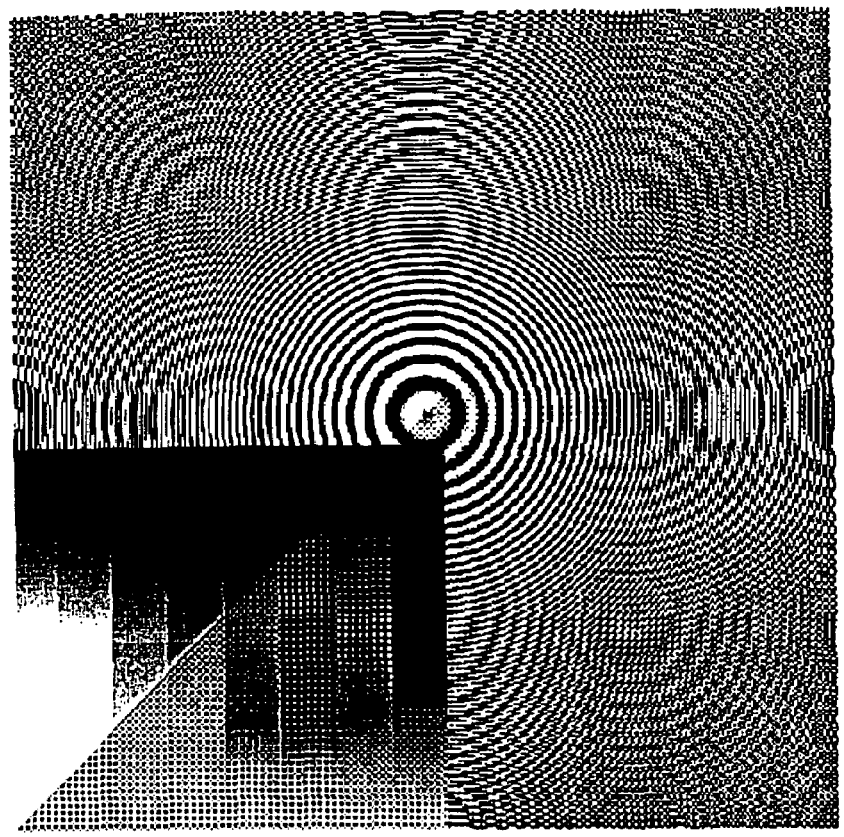
Figure 5:
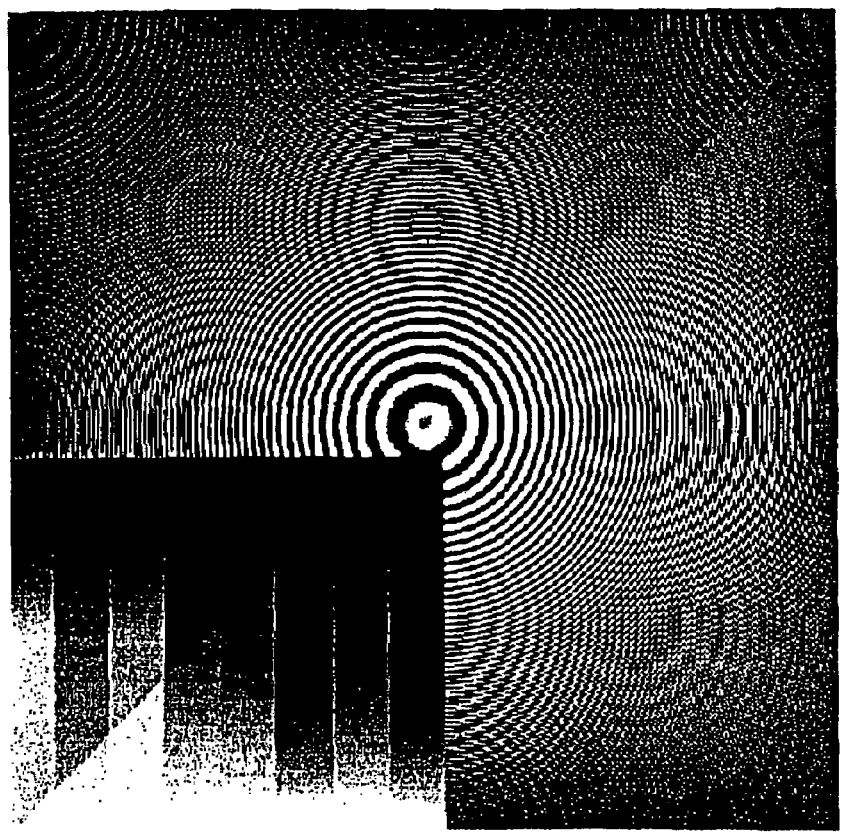
Figure 7:
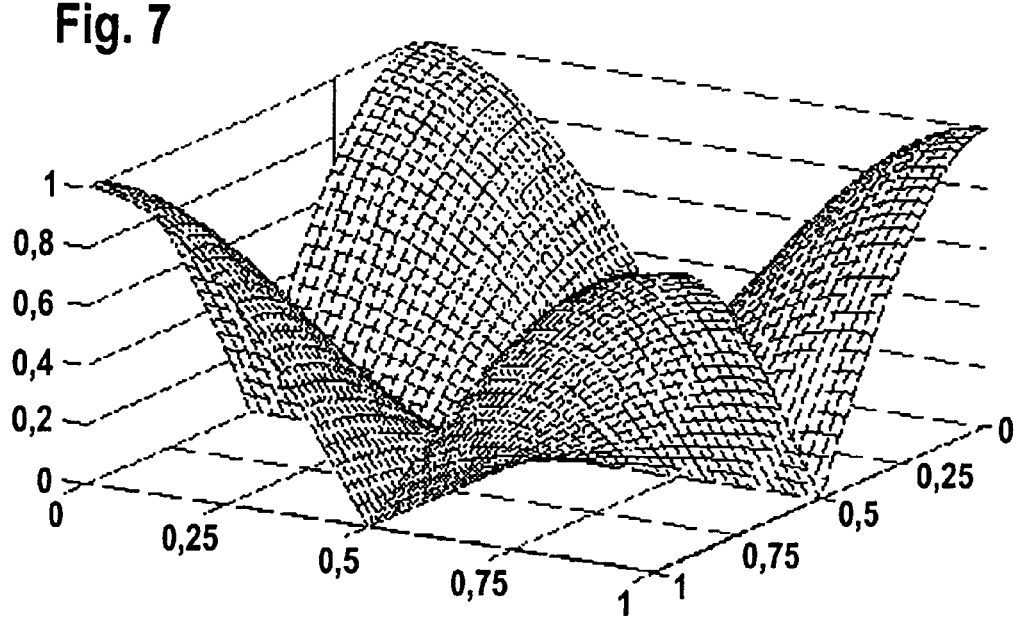
Figure 8:
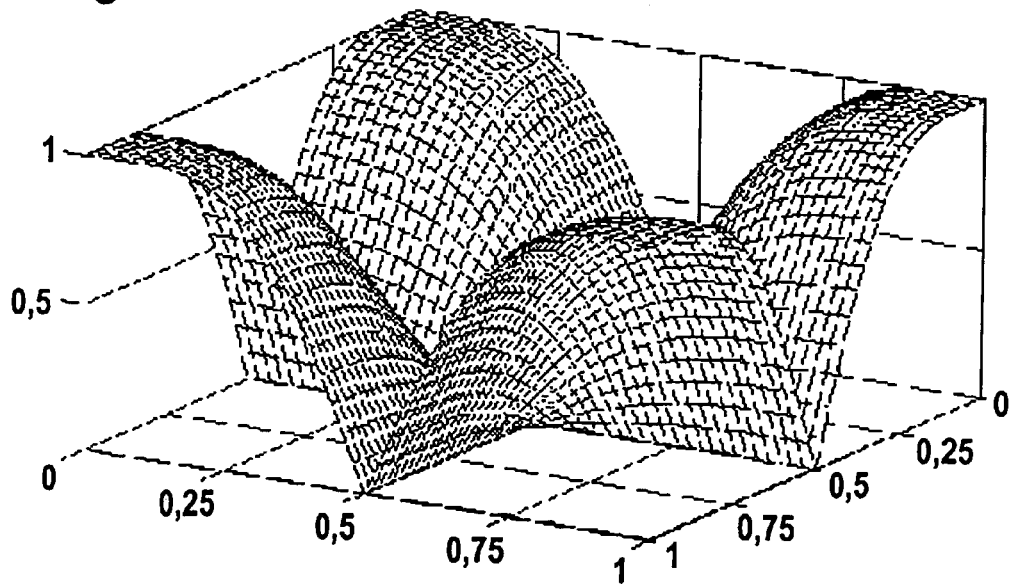
Figure 9:
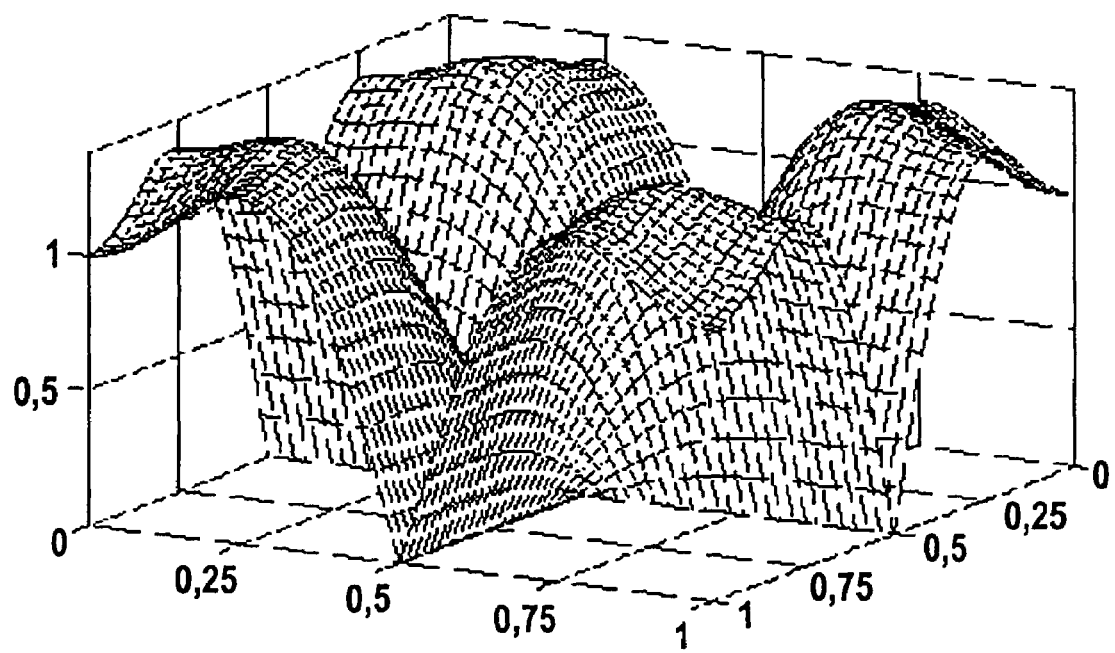

FIG. 3: Realization of the white compensated luminance pixel Yn;

FIG. 4: Example of an original scene (upper-left) and a sensor signal (bottom-right);

FIG. 5: Example of a 2×2 filtered luminance without (upper-left) and with white compensation (bottom right);

Figure 6:
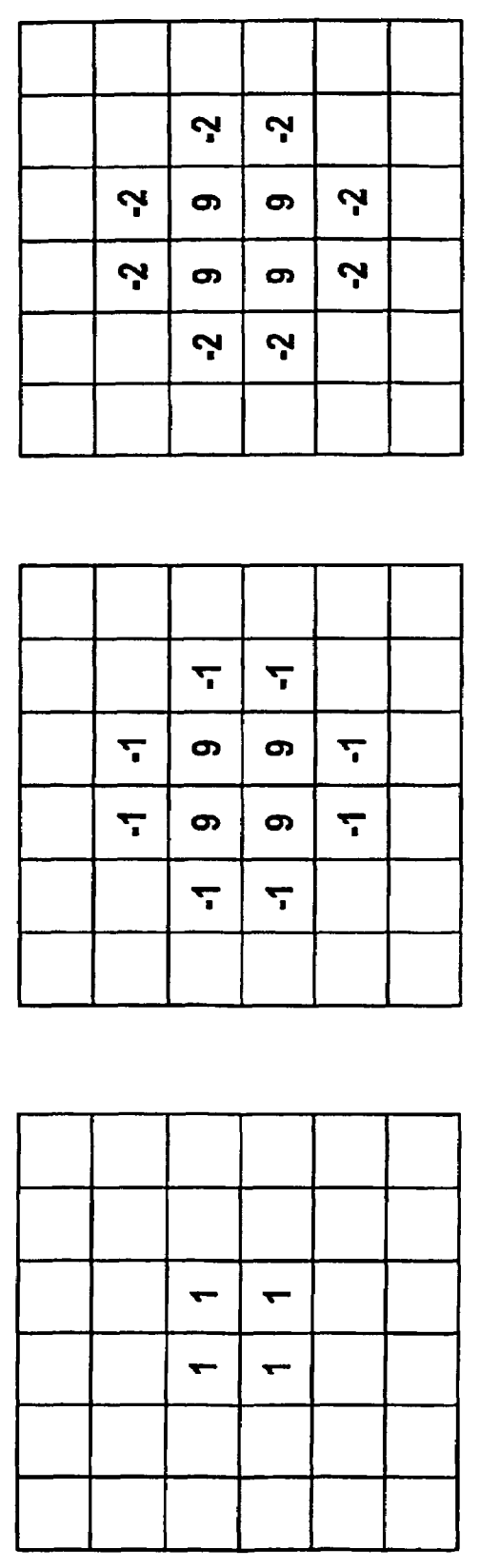

FIG. 6: Several white compensated luminance reconstruction filters;

FIG. 7: Transfer value of a first 2×2 Yn filter;

FIG. 8: Transfer value of a second Yn filter;

FIG. 9: Transfer value of a third Yn filter;

FIG. 10: Scheme for elimination of green-green differences in a 4×4 Yn filter;

FIG. 11: Scheme for elimination of modulation in colored areas; (FIGS. 3 to 11 illustrate the white-compensated-luminance signal of a preferred embodiment which is advantageously free of green-green differences. Green-green differences may be removed by a restoration of a green uniformity of a Bayer image which allows to eliminate green-green differences in the green signal of the sensor with maintenance of a Laplacian (i.e. smartgreen) RGB-reconstruction method and without visible resolution losses. Also they may be removed by preventing green non-uniformity in the parallel contour signal of RGB Bayer image sensors, which may be performed by developing a two-dimensional parallel contour filter that eliminates the green-green differences caused by the image sensor.)

Figure 12:
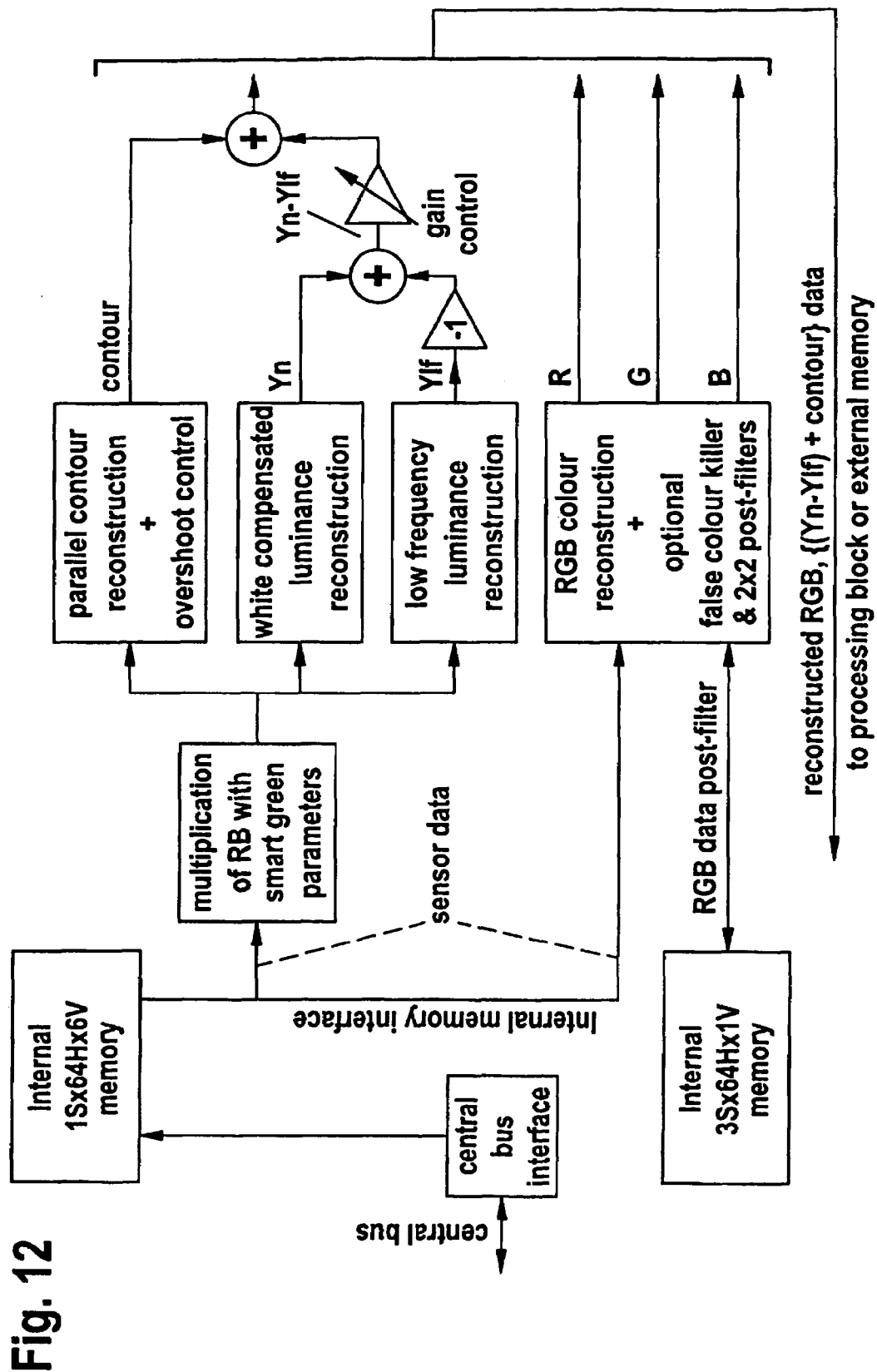
Figure 13:
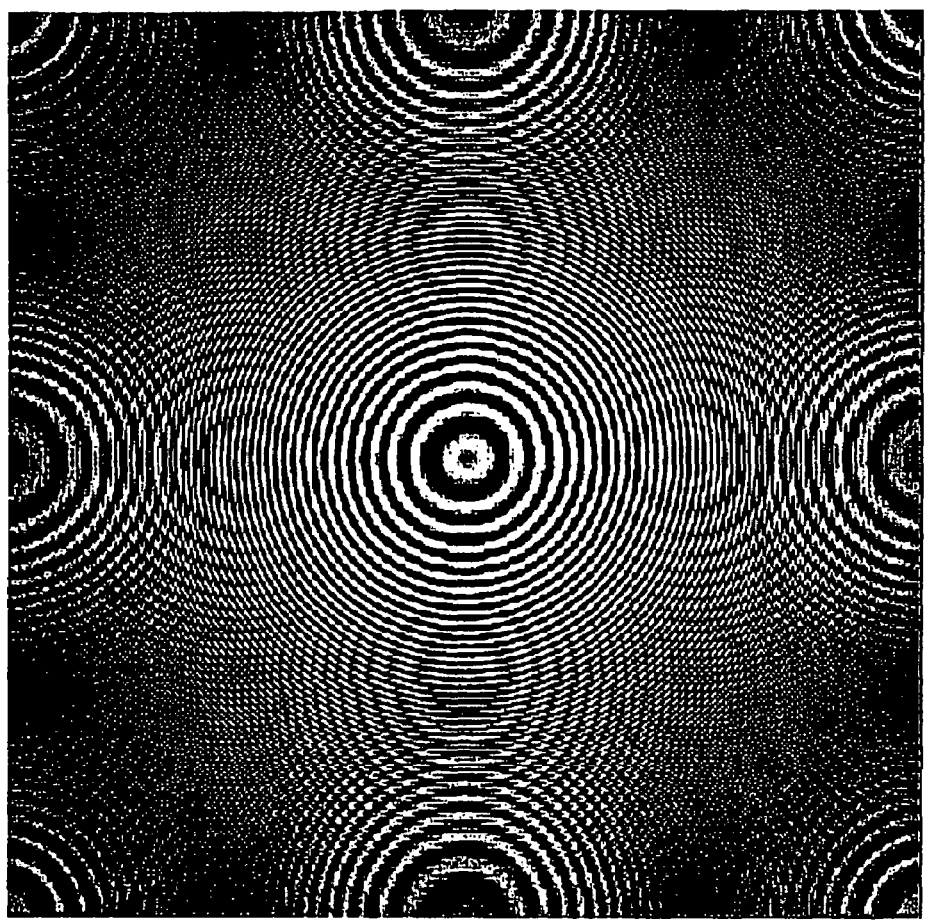
Figure 14:
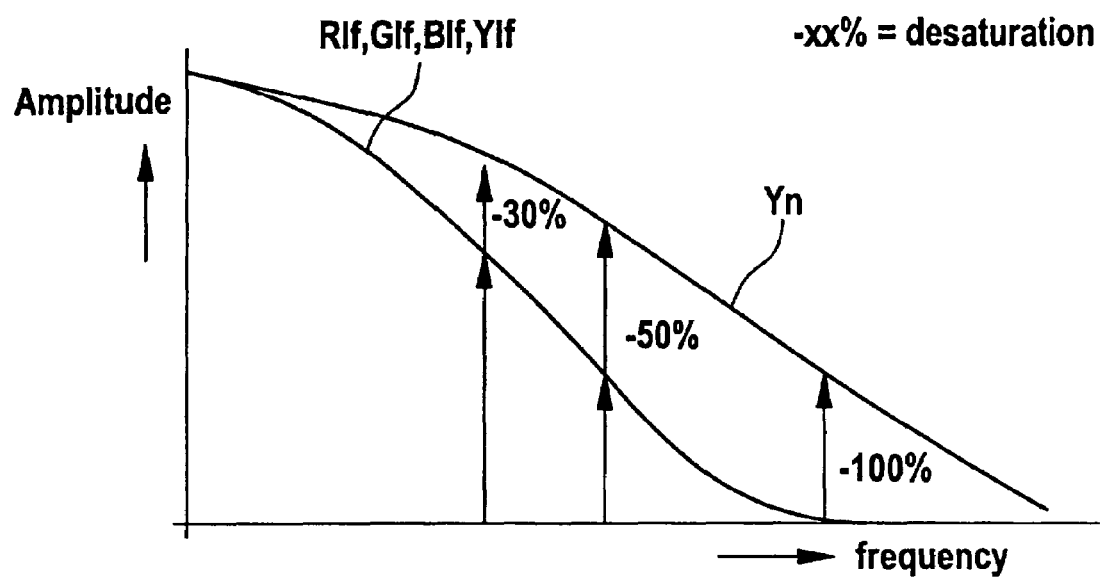
Figure 15:
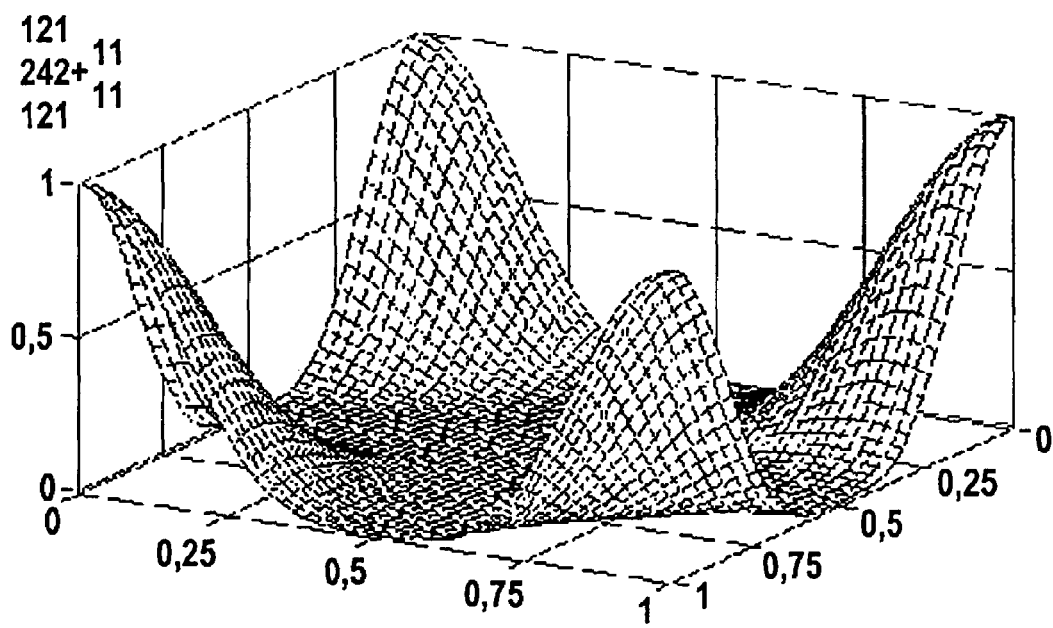
Figure 16:
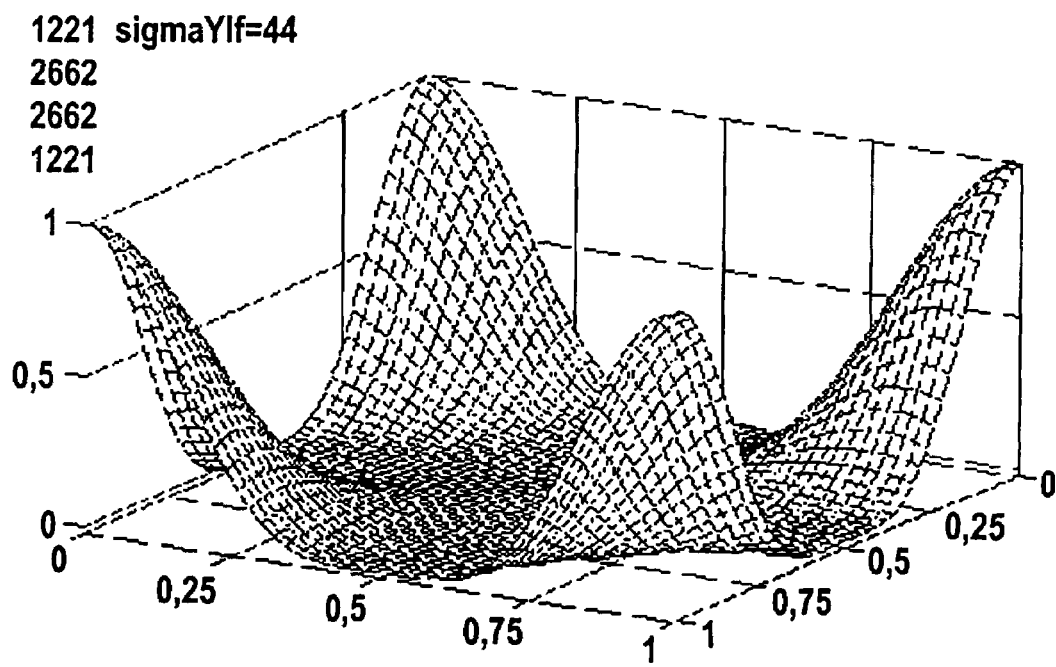
Figure 17:
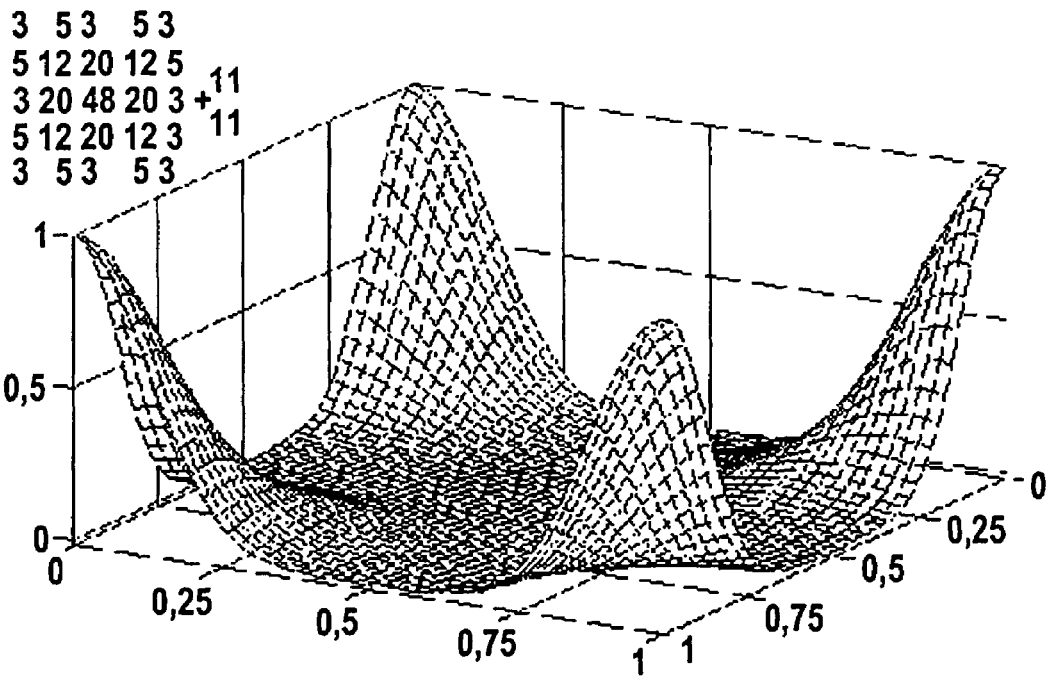
Figure 18:
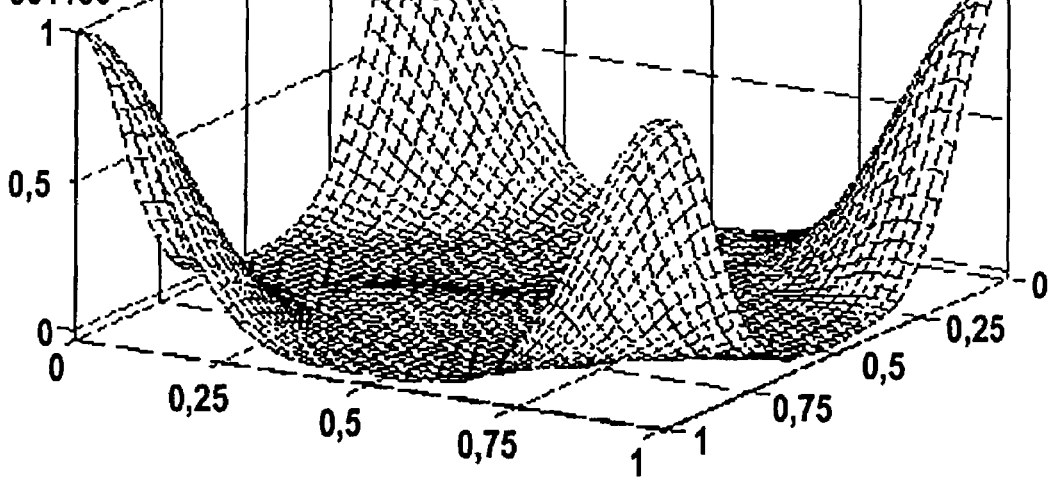
Figure 19:
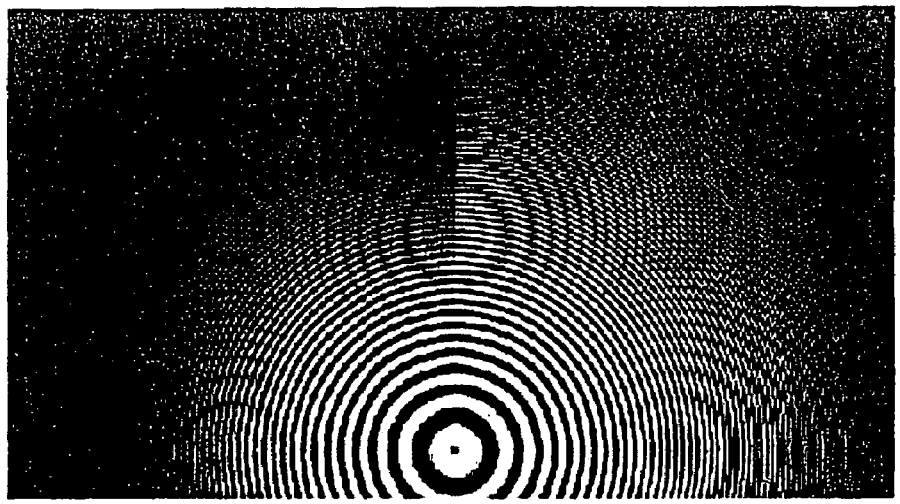
Figure 20:
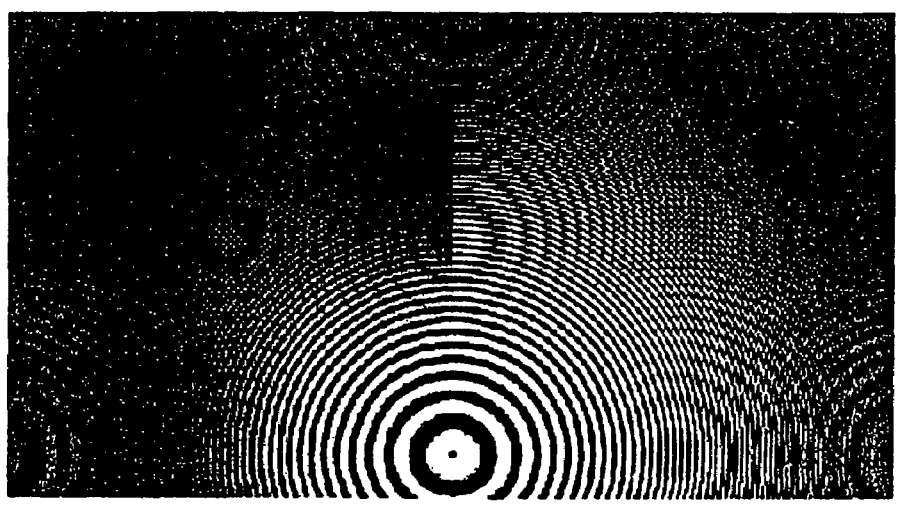

FIG. 12: Basic block-diagram for 2×2 post-filtering using column wise package transfer from the external memory as a preferred embodiment;

FIG. 13: Example of a sensor signal with (Yn−Ylf) added after matrix and white balance (upper-left) and added before (bottom-right);

FIG. 14: Color desaturation as a function of the transfer characteristic of Rlf, Glf, Blf, Ylf and Yn;

FIG. 15: Total value of a 3×3 RGB transfer characteristic followed by a 2×2 post-filter;

FIG. 16: Matching of a 4×4 luminance Ylf low pass filter;

FIG. 17: Total value of a 5×5 G transfer characteristic followed by a 2×2 post-filter;

FIG. 18: Matching of a 6×6 luminance Ylf low pass filter;

FIG. 19: Bandwidth of 3×3 RGB color reconstruction, inclusive (Yn-4×4Ylf) for a unity matrix (right) and without (left);

FIG. 20: Bandwidth of 5×5 RGB color reconstruction, inclusive (Yn-6×6Ylf) for a FT19 matrix (right) and without (left);

(FIGS. 15 to 20 illustrate a preferred embodiment i.e. the realization of the aliasing free low frequency luminance signals.)

Figure 22:
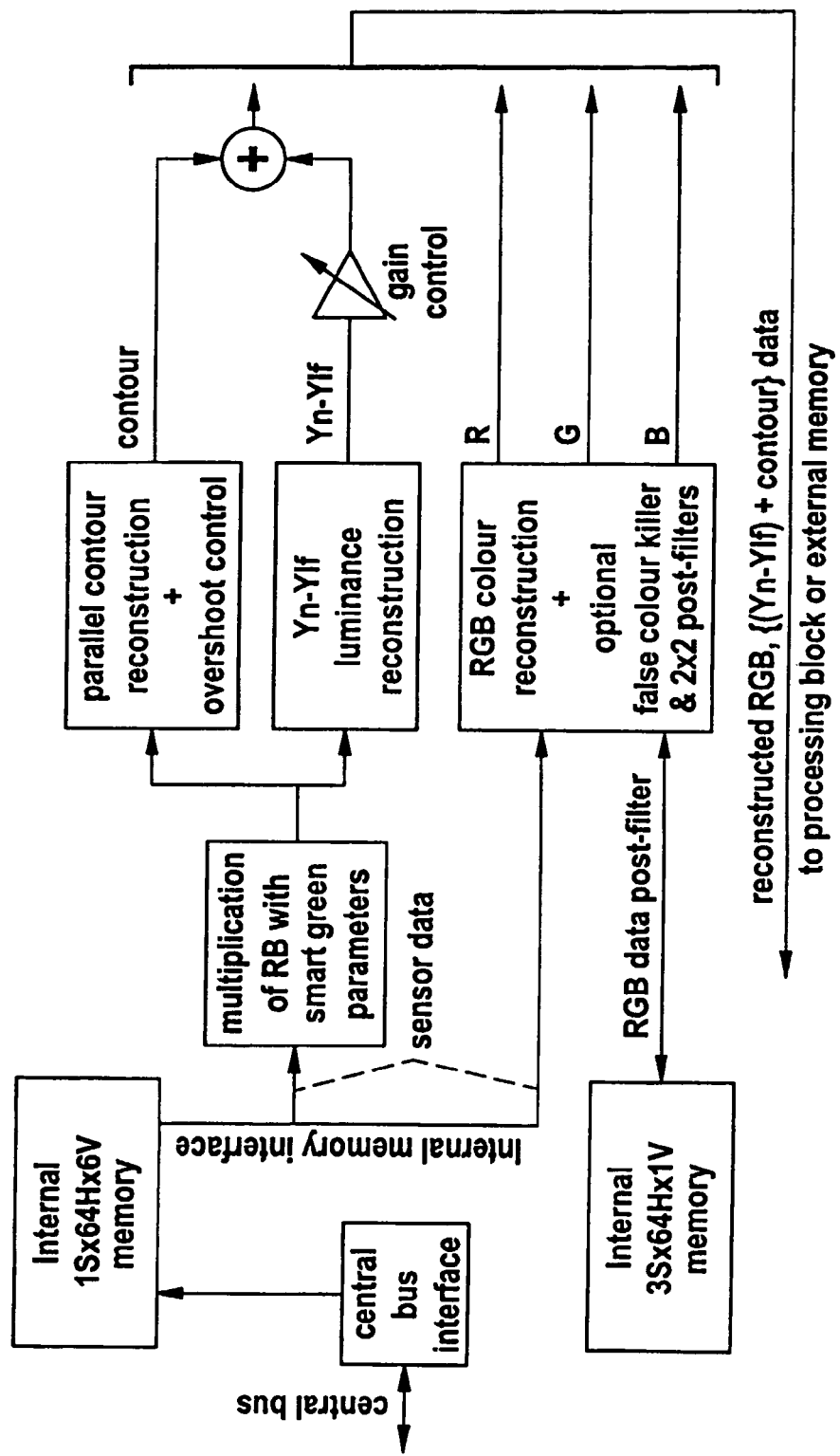
Figure 23:
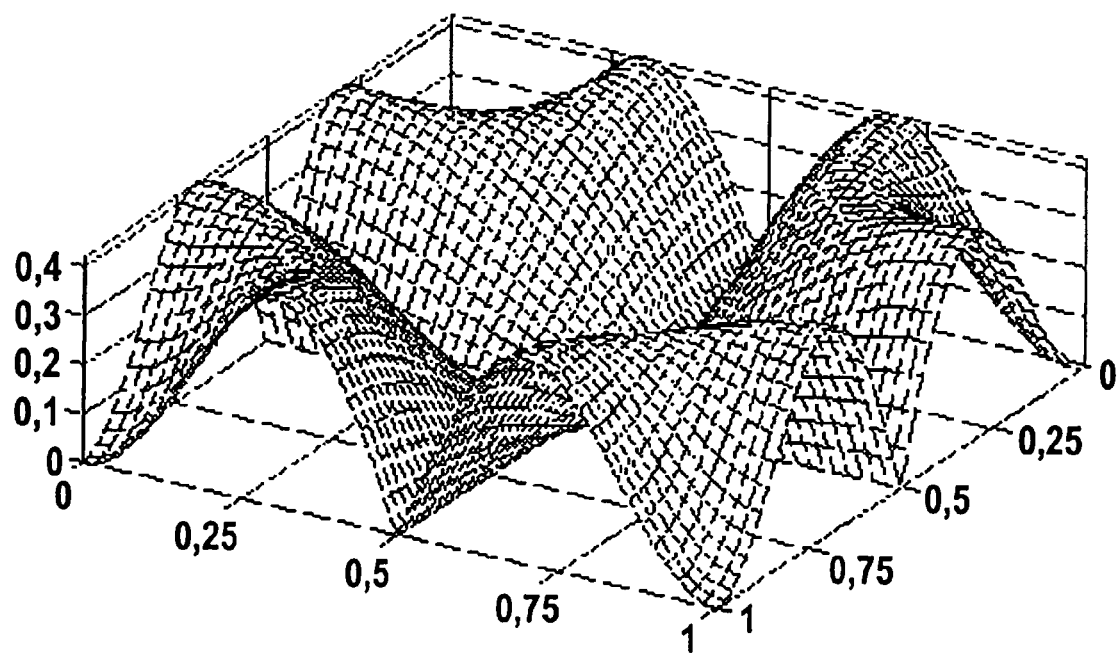

FIG. 21: Three examples of combined (Yn−Ylf) filters;

FIG. 22: Simplified block diagram of smartgreen3 by combining (Yn−Ylf) filter weights;

FIG. 23: High pass transfer characteristic of a 2×2 Yn filter and the 4×4 Ylf; (FIGS. 21 to 23 illustrate a preferred embodiment i.e. combining the 4×4 or 6×6 low pass luminance signals with the white compensated luminance signals.)

Figure 24:
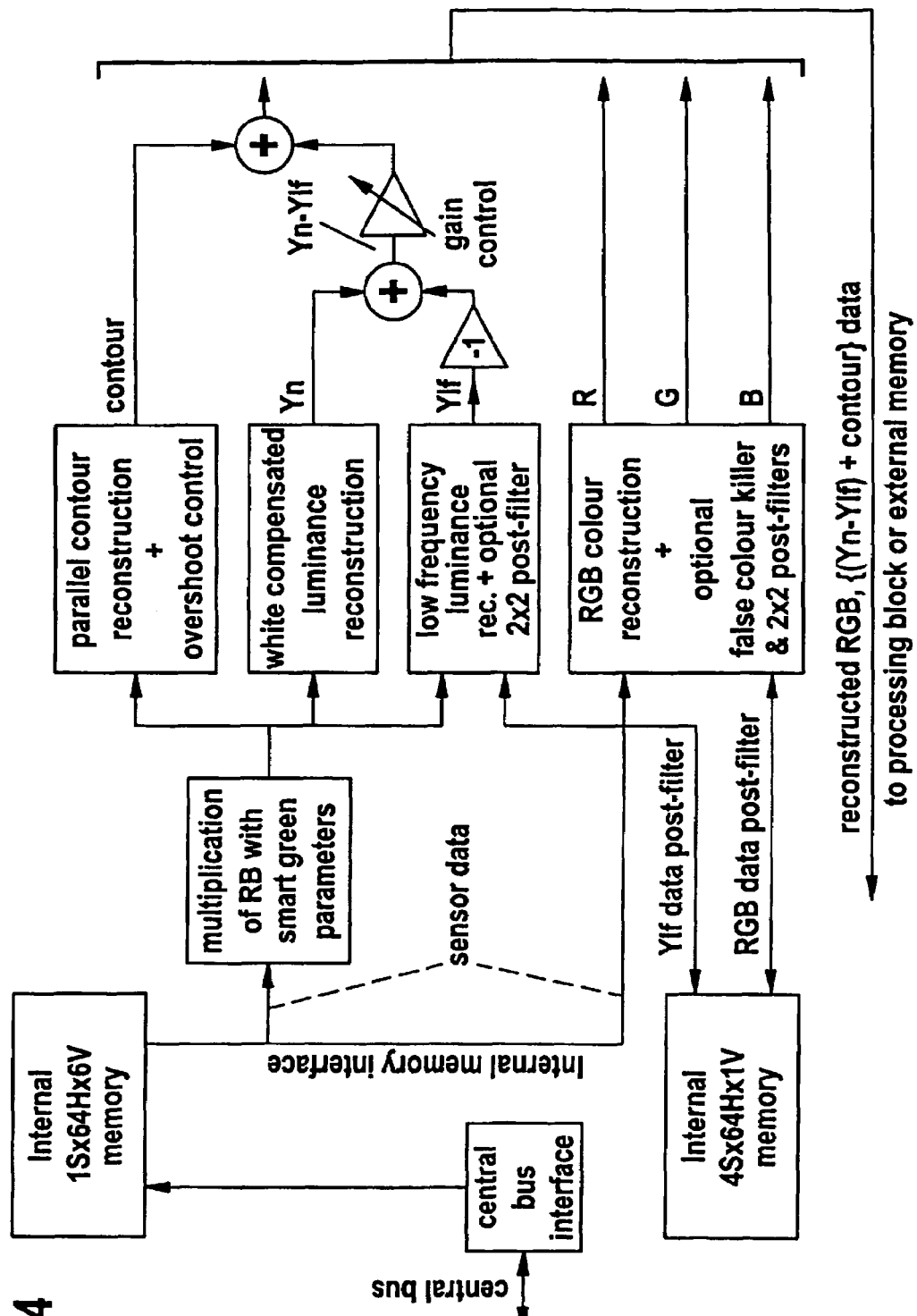

FIG. 24: Basic block diagram for 2×2 RGB- and Ylf-post-filtering using column wise package transfer from an external memory; (FIG. 24 illustrates a preferred embodiment, in particular with regard to post-filtering.)

1. Processing Flow of the White Compensated Luminance Reconstruction Method

In FIG. 1, a part of a general architecture of an integrated circuit with a central bus and an external memory interface is shown. A sensor signal is offered via the central bus to the external memory. For the realization of the RGB-color-reconstruction and of the parallel contour-reconstruction the sensor data is retrieved from the external memory via the central bus to the reconstruction. After reconstruction the data are sent directly to the processing block or sent back to the external memory.

The processing block contains more or less standardized camera functions as the matrix, white balance, knee and gamma. Sending the reconstructed data directly to the processing is an important issue because in order to obtain a fast execution time for still pictures or for video data, the amount of time consuming data swap from and to the memory should be limited.

In FIG. 2 a more detailed block diagram of a preferred embodiment of the proposed method, hereinafter referred to as "smartgreen3"-signal-reconstruction, is shown. Via the central bus the sensor data is sent from the external memory in small packets to a small internal memory array in the reconstruction block. From this [1S×64H×6V] array in FIG. 2, containing 1 Signal (16 bits) and 64 Horizontal by 6 Vertical pixels (768 bytes) as an example, the raw sensor data can be randomly retrieved for reconstruction. In particular, a row of sensor data can be processed in multiples of (64−2*ho) pixels, where ho is the horizontal offset of the filter array. For an n×m reconstruction array, where "n" are horizontal and "m" are vertical pixels, the offset is ho=n div 2 "div" means rounding in the direction of zero to the nearest integer. Therefore it holds ho=1 for n=3, ho=2 for n=4 or n=5 and ho=3 for n=6. The first pixel that can be reconstructed is at position 1+ho, the last one at position N−ho, where N is the total number of pixels in a sensor row. Reconstructing a complete sensor row requires N/(64−2*ho) packages to be sent to the reconstruction block. In the lower part of FIG. 2, the RGB color signals are reconstructed with the raw sensor data. The (low) frequency transfer, by means of the choice of the filter weights, depends on the optical transfer of the camera. Whether the false color killer and the 2×2 post-filters are used or not also depends on the optical transfer. In the upper part of FIG. 2 the R and B pixels are multiplied with the smartgreen parameters. The smartgreen parameters may e.g. be retrieved according to the method disclosed in WO 99/04555 or in EP 01 200 422.2. With this specific signal three aliasing free luminance signals are reconstructed: the contour signal, the white compensated luminance signal Yn and a low frequency luminance signal Ylf. The latter has about the same transfer characteristic as the reconstructed RGB signals. By subtracting the low frequency signal Ylf from the white compensated luminance signal Yn, a high frequency luminance component is generated: (Yn−Ylf). It is important to be aware of the fact that in the preferred embodiment, in order to prevent undesired false colors at higher frequencies, the (Yn−Ylf) signal if ever possible should not earlier be added to each color signal then after the matrix and white balance functions in the processing block. The very same counts for the contour signal. Preventing the mentioned undesired false colors is the reason why the total output of the reconstruction block consists of four or respectively three signals. Besides the fastest possible execution time this is a second reason why it is preferred to send all signals directly to the processing block. A third reason can be that it makes twice a [4S×64H×1V] internal memory superfluous, one in the reconstruction block for sending the four signals to the external memory and one in the processing block for retrieving them again. The [4S×64H×1V] internal memory stands for the storage of four (16 bit) signals of (64−2*ho) horizontal pixels of one vertical row, containing a total of 640 bytes when rounding to 64 pixels.

When maximum flexibility of the design is required, e.g. for a time consuming reconstruction and/or processing by means of specific software via the CPU, then the two [4S×64H×1V] internal memories, one for the reconstruction and one for the processing, should be applied.

At the top of FIG. 2 the aliasing free contour is realized followed by the overshoot control processor which prevents over- and undershoots at lower frequencies. Two-dimensional sharpness improvement using a two-dimensional step transient signal is achieved by the realization of a two-dimensional detection signal which is suited for controlling overshoots. This so called step transient signal can be used for several overshoot (and undershoot) control methods, and results in a very attractive sharpness improvement without exaggerated and unnatural looking overshoots. It is allowed to add the contour and the (Yn−Ylf) signal to a single signal that is sent to the internal [4S×64H×1V] memory.

The following chapters may be summarized as follows.

In chapter 2 the realization of an aliasing free and zero distortion luminance signal Yn with a 2×2 and 4×4 filter array is described. The realization of the low frequency RGB reconstruction follows. Details of a color-reconstruction-filter are disclosed in a patent application with internal file number ID606638-II which has been filed on the same day as this application and which is incorporated by reference herein. The low frequency luminance signal with a 4×4 and a 6×6 low pass filter array will be explained in chapter 3. 4×4 and 6×6 aliasing free contour signals may be provided also alternatively or additional to a 5×5 aliasing free contour-reconstruction-filter. Details of a contour-reconstruction-filter are disclosed in a patent application with internal file number ID 505538-III which has been filed on the same day as this application and which is incorporated by reference herein. The proposed concept may be adapted in a flexible way as a function of the optical transfer and sensor matrix which is described in detail in chapter 4.

2. The White Compensated Luminance Signal

The white compensated luminance signal is based on the calculation of the smartgreen parameters. Examples are shown in WO 99/04555 and EP 01 200 422.2. The SmartGcntrlR and SmartGcntrlB parameters are referred to as wbr and wbb respectively. FIG. 3 shows that the red and blue pixels are multiplied with the smartgreen parameters. Next the four pixels are added together resulting in a white compensated luminance pixel Yn. The center of pixel Yn is shifted half a pixel to the right and to the bottom, considering the R pixel as the first one. The consequence is that all other signals that have to be reconstructed, i.e. red-green-blue and contour, should get the same center position as this Yn signal.

The advantages of the white compensated luminance signal Yn are the very same as for the 5×5 aliasing free contour signal. An aliasing free contour signal for RGB Bayer image sensors is based on a unique 5×5 parallel contour filter that, without the need for an optical low pass filter, has a zero throughput at the first RGB sample frequency. Its signal distortion is almost zero, resulting in a contour signal without visible artifacts. The so far known contour filters amplify the back folded and undesired frequencies outside the Nyquist domain of the sensor as well. This will lead to distortions and as a consequence a better visibility of the unwanted aliasing components in the picture. This unique 5×5 contour filter prevents those aliasing artifacts and moreover eliminates the green-green differences caused in the green channel of the image sensor. Particular advantages are:

1. Without the need of an OLPF (optical low pass filter), the Yn signal has a zero throughput at the first RGB sample frequencies, so it will cause no aliasing at those points. At the second and higher multiples of the sample frequencies the throughput is low, but the low pass of the lens and the modulation transfer function (MTF) of the sensor will be effective there as well.
2. The signal distortion is almost zero, resulting in a luminance signal Yn without visible artifacts.

In the following it will be explained why a 2×2 white compensated luminance filter is particularly advantageous.

1. The 2×2 unity is needed for the elimination of the modulated color information in the sequential RGB Bayer color signal of the image sensor and the elimination of the green non-uniformity caused by the image sensor. Preventing green non-uniformity in the parallel contour signal of RGB Bayer image sensors is achieved by a method for developing a two-dimensional parallel contour filter that eliminates the green-green differences caused by the image sensor. Parallel contour processing for Bayer image sensors allows to use the green signal from the image sensor for generating a two-dimensional contour signal in parallel with the RGB color reconstruction.

The advantage is that no extra row delays are needed as it is the case with serial contour processing. It has to be noted that whatever OLPF-type has been used, it does neither influence this color modulation in large saturated color areas nor the green non-uniformity.
2. The multiplication by the smartgreen parameters is needed in order to undo the effect of a matrix. wherein the sum of the coefficients of the matrix is not equal to unity, and/or the effect of an environmental color temperature.

These are the two reasons why the smartgreen parameters are calculated. If those parameters are not unity, the color sensor will not act as a black and white sensor.

In FIG. 4, in the upper-left part the original scene of a test image is shown, while in the bottom-right part a signal of the image from the image sensor is shown as realized with a theoretical FT33 matrix. Clearly the modulation in the colored scene parts can be seen and of course the aliasing outside the RGB Nyquist domains.

In FIG. 5, in the upper-left part, a 2×2 filtered luminance signal without white compensation is shown, while in the bottom-right part it is shown with the white compensation applied. Both parts are simulated with a theoretical FT33 matrix, for which the smartgreen parameters are unequal to unity. This clearly shows the benefit of those parameters for the realization of the desired aliasing free and zero distortion luminance signal Yn.

A slight disadvantage of the 2×2 white compensated luminance signal Yn may be that the resolution will be reduced when an optical low pass filter (OLPF) is applied. However this can be compensated by applying 4×4 filters for the reconstruction of Yn. Depending on the amount of the low pass transfer of the OLPF, a Yn filter with heavier weights can be chosen. On the left hand side of FIG. 6 the already described 2×2 Yn filter is shown. In the middle and on the right hand side two 4×4 Yn filters are shown. The right one is the 'heaviest' filter. Besides for compensating the transfer loss of an OLPF they also can be applied for compensation of the transfer loss of the lens.

In FIGS. 7, 8 and 9 a corresponding 3D plot of the luminance filters of FIG. 6 are shown. Those 3D plots show the absolute transfer value in vertical direction. The weights of the second and third filter can of course be varied to other values, depending on the finally desired transfer characteristic.

The 4×4 Yn filters restore the green uniformity and eliminate the modulation in colored areas as well. The green uniformity restoration can be achieved by preventing green non-uniformity in the parallel contour signal of RGB Bayer image sensors which may be performed by developing a two-dimensional parallel contour filter that eliminates the green-green differences caused by the image sensor. Parallel contour processing for Bayer image sensors allows to use the green signal from the image sensor for generating a two-dimensional contour signal in parallel with the RGB color reconstruction. The advantage is that no extra row delays are needed as it is the case with serial contour processing. As a rule one may say: The subtraction of neighbor diagonal filter coefficients should result in a zero contribution. This will average and, as a consequence, eliminate the green-green differences of the neighbor green pixels.

In FIG. 10 it is shown how according to that rule the green-green differences are eliminated.

In FIG. 11 two ways are shown to eliminate the modulation in colored areas. The circle in the middle, with the positive coefficients, always adds two green and one red and one blue pixel. The shown combinations of the negative coefficients always resulting in an addition of two green and one red a one blue pixel, also have the advantage of a zero transfer for the color modulation. It is to be noted that depending on the combination of the total optical transfer and the heaviness of an arbitrary 4×4 Yn filter, finally undesired over- and undershoots can occur. The choice of the coefficients can only be done when the optical transfer is known, for example by shooting and processing a zone plate scene.

3. The Low Pass Filtered Luminance Signal Ylf

FIG. 12 is another basic block diagram showing column wise package transfer including the internal memory needed for a 2×2 post-filter, wherein the memory is only 64 pixels wide.

A low pass filtered luminance signal Ylf is preferably realized nearby matching to the transfer characteristic of a 3×3 or 5×5 RGB reconstruction filter. The difference of the white compensated luminance signal Yn and the low pass filtered signal Ylf, i.e. the (Yn−Ylf) signal, will act as a complementary high pass filter of a low pass reconstructed RGB color signal. This high pass signal is added to each RGB color signal. The reason why this preferably has to be done after the matrix and the white balance will be explained first.

3.1 Adding High Frequency Components after Matrix and White Balance

The upper-left part of FIG. 13 shows the result of adding a high frequency luminance component Yhf to a RGB color signal after the matrix and the white balance. Here Yhf is equal to (Yn−Ylf), but the very same counts for other added high frequency signals like a contour signal. The bottom-right part shows the undesired false colors when Yhf is added before the matrix. Adding an equal high frequency component Yhf to the RGB colors means adding a black and white (i.e. gray) component to the existing colored edges. If due to the matrix and the white balance the added gray component is disturbed, then false colors at the higher frequencies occur. In the case Yhf is added before the matrix and white balance, then the following will apply:

$$Ro'=(a11*(Ri+Yhf)+a12*(Gi+Yhf)+a13*(Bi+Yhf))*awbR$$

$$Go'=(a21*(Ri+Yhf)+a22*(Gi+Yhf)+a23*(Bi+Yhf))$$

$$Bo'=(a31*(Ri+Yhf)+a32*(Gi+Yhf)+a33*(Bi+Yhf))*awbB$$

Ro', Go' and Bo' are the output signals after matrix and white balance. The "axx" parameters are the sensor matrix values. (Ri+Yhf), (Gi+Yhf) and (Bi+Yhf) are the color input signals before the matrix, with an equal Ylf component added. The white balance parameters are awbR and awbB. When isolating the high frequency component of the output signal this becomes:

$$Ro'=(a11*Ri+a12*Gi+a13*Bi)*awbR+Yhf*(a11+a12+a13)*awbR$$

$$Go'=(a21*Ri+a22*Gi+a23*Bi)+Yhf*(a21+a22+a23)$$

$$Bo'=(a31(Ri+a32*Gi+a33*Bi)*awbB+Yhf*(a31+a32+a33)*awbB$$

The chance is extremely small that the sum of each of the matrix coefficients in combination with the white balance parameters awbR and awbB, will be unity. Only in this very unlikely case the color balance at higher frequencies will not be disturbed, in all other cases it will be disturbed. In order to prevent this, the high frequency component Yhf should be added after the matrix and white balance. This will advantageously result in:

$$Ro'=(a11*Ri+a12*Gi+a13*Bi)*awbR+Yhf$$

$$Go'=(a21*Ri+a22*Gi+a23*Bi)+Yhf$$

$$Bo'=(a31(Ri+a32*Gi+a33*Bi)*awbB+Yhf$$

3.2 Desaturation at Colored Edges

By adding the (Yn−Ylf) signal to each RGB color signal the bandwidth of the color signals will increase, but the higher the added frequency component is, the lower the color saturation will be. The amount of color desaturation at edges depends on the differences between the transfer characteristics of the reconstructed RGB signals and the (Yn−Ylf) signal. At the highest frequencies of the (Yn−Ylf) signal the saturation will become zero, resulting in a black and white RGB color signal. In FIG. 14 an illustration is given of the desaturation due to the differences between the transfer characteristics of the Yn signal and the color and luminance low frequency signals, Rolf, Glf, Blf and Ylf. The latter are all supposed to ideally have equal transfer characteristics. In this specific case the area between the low frequency Yif and the Yn transfer curve is the added luminance component (Yn−Ylf) to each color.

Increasing the bandwidth of the Yn signal (as advantageously effected by filters of FIG. 6), or increasing the (Yn−Ylf) high frequency component by means of the gain control (as in the preferred embodiment shown in FIG. 2), will also increase the desaturation as function of the frequency. For the contour filter the same rules of desaturation count as for the (Yn−Ylf) signal.

3.3 Defining the Ylf Filter Transfer

Even more important than the desaturation aspect is the obtained sharpness by adding (Yn−Ylf) to a color signal. In practice the matching of the Ylf and the color filter transfer characteristics is not critical. Nevertheless two well matching low pass luminance filters are presented here, one for a 3×3 color reconstruction filter and one for a 5×5 one, both inclusive a 2×2 post-filtering.

Due to the same filter weights, the total R, G and B transfer characteristics are perfectly equal. "Total" means that all filter weights of one color are used, inclusive the 2×2 post-filter, for obtaining the reference transfer characteristic with which the Ylf filter has to match. In FIG. 15 the total RGB transfer characteristic is shown and in FIG. 16 the very well matching Ylf transfer. These 4×4 filter weights have been chosen such that a modulated color information (as explained in the beginning of chapter 2) as well as a green non-uniformity will be eliminated. In the upper-left corner of FIGS. 15 and 16 the filter weights are depicted.

Because the red/blue and green transfer characteristics of a 5×5 color reconstruction filter in general do not perfectly match, the green transfer has been chosen as a reference. For the human eye green light has the largest luminance contribution. In FIG. 17 the total 5×5 green transfer characteristic, inclusive a 2×2 post-filtering, is shown. FIG. 18 shows the closely matching 6×6 low pass Ylf transfer curves. This filter also eliminates the modulated color information and the green non-uniformity.

On the right hand side of FIG. 19 the sharpness improvement is shown when the (Yn−4×4Ylf) high frequency signal is added to the 3×3 RGB reconstructed and 2×2 post filtered signal of the left hand side. A 2×2 Yn signal and a unity matrix have been applied. A similar result is shown in FIG. 20. On the right hand side the sharpness improvement can be seen when the (Yn−6×6Ylf) high frequency signal is added to the 5×5 3×3 RGB reconstructed and 2×2 post filtered signal of the left hand side. A 2×2 Yn signal and the FT19 matrix have been applied here.

If the bandwidth of the low pass filtered luminance signal is too large with respect to the color signals then the high frequency component (Yn−Ylf) will give a small contribution. If the bandwidth is too low then the contribution of (Yn−Ylf)

will be larger. Depending on whether a smaller or larger bandwidth is preferred, instead of trying out all kind of other Ylf filters, it may be preferred to vary the (Yn−Ylf) amplitude with the gain control as it is shown in FIG. 12. A further possibility to control the high frequency transfer is offered by the selection of a 4×4 Yn signal (as shown in FIG. 6). FIG. 12 is the basic block diagram of a column wise package transfer including the internal memory needed for the 2×2 post-filter, the memory being only 64 pixels wide.

A possibility of a perfect match of Ylf- and color transfer characteristic is shown in the following: It is possible to realize a low pass Ylf-filter with the very same coefficients as for the total 3×3 and 5×5 color filters of FIGS. 15 and 17. By adding some additional internal memory, as shown in FIG. 24, a 2×2 post-filter can be realized. The Ylf transfer characteristics now will perfectly match with the color transfer curves. The post-filter will also eliminate the green non-uniformity of the 5×5 green filter. Because the match is not so critical and the possibility of simplifying the circuitry can be excluded (see chapter 3.4.), this perfect match option is not preferred, but also possible.

3.4 Simplifying the Circuitry

Having defined the Yn and Ylf filter weights it is possible to combine Yn and the Ylf filters as shown in the block diagram of FIG. 12.

As a first example the 2×2 Yn filter of FIG. 6 and the 4×4 Ylf filter of FIG. 16 are combined. The total weight factor of both filters should become equal. By multiplying the weights of the Yn filter by 11, for both, the total weight has become 44. In order to obtain the (Yn−Ylf) signal with a single instead of two filters, the Ylf weights have to be subtracted from the Yn ones. This results in the filter weights as shown on the left hand side of FIG. 21. In order to maintain the amplitude, the output signal of this filter has to be divided by a factor of 22. In FIG. 23 the respective high pass transfer characteristic is depicted.

As a second example the middle Yn filter of FIG. 6 and again the Ylf filter of FIG. 16 are combined. The sum of their weights are respectively 28 and 44. By dividing them by 4 the smallest sum factors are obtained: 7 and 11. All weights of the Yn filter now are multiplied by a factor of eleven and those of the Ylf filter by seven, resulting in a total weight of 308 for both which will require 9 bits). By subtracting the multiplied weight factors of the Ylf filter from those of the Yn filter the weights of the combined filter are obtained as shown in the middle of FIG. 21. To maintain the output amplitude a division by a factor of 308 is needed.

As a final example the middle Yn filter of FIG. 6 and the Ylf filter of FIG. 18 are combined. The sum of their weights are respectively 28 and 84. By dividing them by 28 the smallest sum factors are obtained: 1 and 3: All weights of the Yn filter now are multiplied by a factor of 3 and those of the Ylf filter with 1, resulting in a total weight of 84 for both. By subtracting the multiplied weight factors of the Ylf filter from those of Yn filter the weights of the combined filter are obtained as shown in the right hand side of FIG. 21. To maintain the output amplitude a division by a factor of 84 is needed.

In FIG. 22 a simplified block diagram of smartgreen3 is shown, which is derived from FIG. 12. For doing experiments this configuration is somewhat less flexible than the one of FIG. 12, but for the final chip design this is not a real disadvantage. For this purpose the reduction in chip area and complexity and increasing the speed may be more important. Still reason may undo this simplification proposal: the need for the Yn signal in the overshoot control processor.

4. Defining Smartgreen3 as a Function of the Optical Transfer and Sensor Matrix

The description of smartgreen3 so far has made it possible to define its configuration as a function of the heaviness of the sensor matrix and of the optical transfer.

In case of a heavy matrix, independent of the optical transfer, always a 5×5 color reconstruction filter should be applied. It depends on the optical transfer whether the first, second or third Yn filter of FIG. 6 has to be applied. In case of a high optical transfer the first 2×2 Yn signal should be used, in case of a lower one the second or possibly the third one should be used. A false color killer should be switched on, even in case of a heavy OLPF, in order to eliminate false colors around the red/blue Nyquist frequency.

In case of a light matrix and a heavy OLPF with an almost zero throughput starting from the red/blue sample frequencies, a 3×3 color reconstruction filter may be chosen. As a consequence of the 3×3 color filter the 4×4 Ylf filter of FIG. 16 is chosen. In order to gain some resolution the second or even third Yn filter of FIG. 6 may be applied. The false color killer can be switched on but if it is hardly effective it may be switched off. In case of hardly or no OLPF, also the 3×3 color reconstruction filter, the 4×4 Ylf filter of FIG. 16 and the 2×2 Yn signal may be used. The false color killer should be switched on. It will have become clear that the choice of the left, middle or right Yn filter in FIG. 6 depends on the amount of optical low pass filtering. The 2×2 Yn signal in case of hardly or no OLPF is chosen, otherwise the 4×4 Yn filters when a heavier OLPF has been used. The adjustment of the false color killer is much less critical with the smartgreen3 color reconstruction than with the prior art smartgreen1/2 methods. Also an adjustment procedure can be applied.

The choice and the adjustment of a contour filter depends on a personal taste. The only directive is to apply a 4×4 contour filter in case of a 3×3 color reconstruction and a 6×6 contour filter in case of a 5×5 one. Also in these cases special attention has to be paid to the desaturation of colored edges.

5. Conclusions

The following particular advantages are achieved with the smartgreen3 reconstruction-method compared with the prior art smartgreen1- and smartgreen2-methods:

It is a flexible design. Depending on the heaviness of the sensor matrix a choice can be made between two color reconstruction filters. As a consequence the (low pass) luminance filters can be defined application specific. Several high frequency luminance filters can be chosen and adjusted as function of the optical transfer of the camera.

If a false color killer is needed, then, depending on the chosen color reconstruction, a signal does hardly or not suffer from visible artifacts (black and white dots). The reason is that a stronger low pass filtered color reconstruction is used than with smartgreen1 or smartgreen2.

All generated luminance signals are free of aliasing and distortion by means of the so called luminance white compensation in combination with the filter weights.

All filters of the smartgreen3 design, presented here, eliminate the green non-uniformity caused by the sensor. The 5×5 green reconstruction filter finally does it with the help of the 2×2 post-filter.

In summary, due to its flexibility and the lack of signal distortion and its optional false color killer, smartgreen3 is well suited for the reconstruction and processing of digital images and of contiguous video pixels of sensors with a Bayer color filter array.

The invention claimed is:

1. A method for signal processing, wherein a sensor signal of an image sensor is provided as an input and wherein the input is reconstructed in a filter to establish an output for further processing, wherein the filter comprises at least one reconstruction-filter selected from the group consisting of: a luminance-reconstruction-filter, a red-green-blue-color-reconstruction-filter and a contour-reconstruction-filter,
wherein the sensor signal comprises a plurality of pixels, and a pixel provides a color value assigned to at least one of the colors red, green or blue, characterized in that the method comprises the steps of:
applying the reconstruction-filter to an array of pixels of predetermined array size comprising a number of pixels of said plurality of pixels, wherein at least one of the number of pixels is formed by a red-pixel assigned to the color of red, at least one of the number of pixels is formed by a blue-pixel assigned to the color of blue, and at least one of the number of pixels is formed by a green-pixel assigned to the color of green;
weightening the red- and/or the blue-pixel by a green-parameter;
summarizing the pixels of the array into one output-pixel; and
centering the output-pixel in the array.

2. The method as claimed in claim 1, wherein said method further comprises the steps of:
positioning a center-output-pixel of a second filter subsequent to a first filter in phase with the output-pixel, by centering the center-output-pixel at the same center position of the array as the output-pixel.

3. The method as claimed in claim 1, characterized in that the reconstruction-filter is a luminance-reconstruction-filter and the pixels of the array are added together in one white-pixel being the output-pixel.

4. The method as claimed in claim 1, wherein said method further comprises the step of:
choosing the green-parameter in dependence of a sensor matrix of the image sensor.

5. The method as claimed in claim 1, wherein said method further comprises the step of:
choosing the green-parameter in dependence of an optical transfer of an optical system providing an image signal to the image sensor.

6. The method as claimed in claim 1, wherein said method further comprises the step of:
applying the luminance-reconstruction-filter to an array-size of 2×2 or 4×4 or 6×6.

7. The method as claimed in claim 6, wherein said method further comprises:
applying a low-pass-filter to an array size of 4×4 or 6×6.

8. The method as claimed in claim 6, characterized in that the luminance-reconstruction-filter and the low-pass-filter are combined into one single filter.

9. The method as claimed in claim 1, wherein said method further comprises the step of:
applying subsequent to the luminance-reconstruction-filter the color-reconstruction-filter wherein in particular the color-reconstruction-filter comprises a false-color-filter to eliminate false colors from the input.

10. The method as claimed in claim 1, wherein said method further comprises the step of:
applying a post-filter to maintain in its output a phase to the output of a previous applied reconstruction-filter, in particular by applying the post-filter subsequent to a false-color-filter to maintain a phase to a previous applying luminance-reconstruction-filter.

11. The method as claimed in claim 10, wherein said method further comprises the step of:
applying subsequent to a false-color-filter a post-filter of 2×2 array-size, to position a center-output-pixel of a predetermined small array of green-pixels in phase with a white-pixel which is centered with respect to the same array as that to which a luminance-reconstruction-filter has been applied to.

12. The method as claimed in claim 1, wherein said method further comprises the step of:
offering various luminance-reconstruction-filters for appliance, in particular by applying a luminance-reconstruction-filter to an array size of 2×2 in case of no or slight optical low pass filtering and/or applying a respective luminance-reconstruction-filter to an increased array-size of 4×4 or 6×6 upon heavier optical low pass filtering.

13. The method as claimed in claim 1, wherein said method further comprises the step of:
offering various color-reconstruction-filters for appliance, in particular applying a 3×3-color-reconstruction-filter in case of a 4×4-luminance-reconstruction-filter and/or applying a 5×5-color-reconstruction-filter in case of a 6×6-luminance-reconstruction-filter.

14. An apparatus for signal processing, said apparatus comprising:
an image sensor for providing a sensor signal as an input; and
a filter for reconstructing the input to establish an output for further processing, wherein the filter comprises at least one reconstruction-filter selected from the group consisting of: a luminance-reconstruction-filter, a red-green-blue-color-reconstruction-filter and a contour-reconstruction-filter, and wherein the sensor signal comprises a plurality of pixels, and a pixel provides a color value assigned to at least one of the colors red, green or blue, wherein, the reconstruction-filter is adapted to be applied to an array of pixels of predetermined array size comprising a number of pixels, wherein at least one of the number of pixels is formed by a red-pixel assigned to the color of red, at least one of the number of pixels is formed by a blue-pixel assigned to the color of blue, and at least one of the number of pixels is formed by a green-pixel assigned to the color of green, and wherein
the apparatus further comprises:
means for weightening the red- and/or the blue-pixel with a green-parameter;
means for summarizing the pixels of the array into one output pixel; and
means for centering the output pixel in the array.

15. A computer-readable medium having stored thereon a computer program product, said computer program product comprising a software code section which induces a computing system to execute the method as claimed in claim 1 when the computer program product is executed on the computing system.

* * * * *